UNITED STATES PATENT OFFICE.

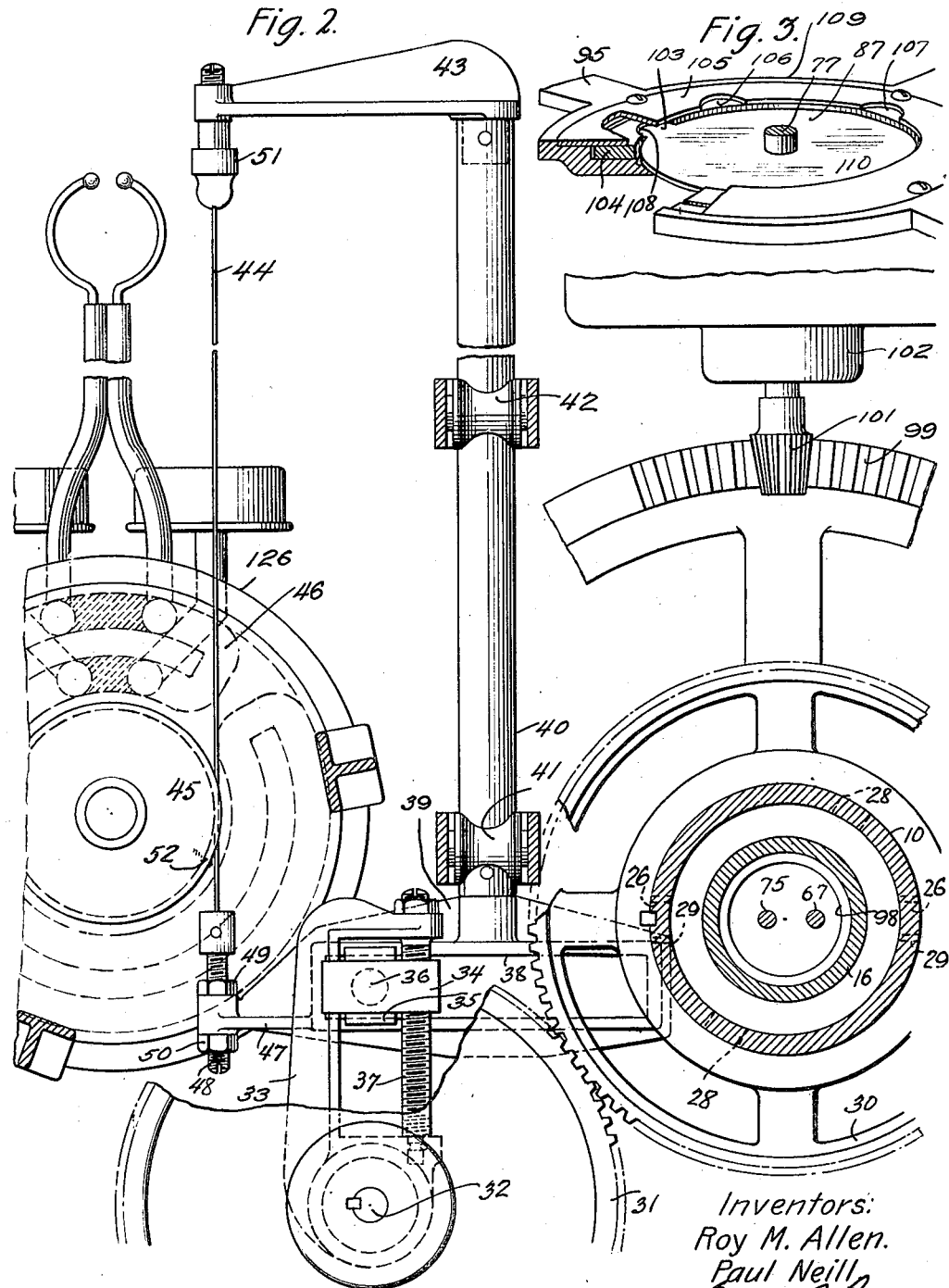

ROY M. ALLEN, OF BLOOMFIELD, AND PAUL NEILL, OF EAST ORANGE, NEW JERSEY, ASSIGNORS TO WESTERN ELECTRIC COMPANY, INCORPORATED, OF NEW YORK, N. Y., A CORPORATION OF NEW YORK.

COMPENSATOR.

1,415,973.	Specification of Letters Patent.	Patented May 16, 1922.

Application filed January 8, 1921. Serial No. 436,011.

*To all whom it may concern:*

Be it known that we, ROY M. ALLEN and PAUL NEILL, citizens of the United States, residing at Bloomfield and East Orange, respectively, in the county of Essex and State of New Jersey, have invented certain new and useful Improvements in Compensators, of which the following is a full, clear, concise, and exact description.

This invention relates to compensative devices and more particularly to compensators employed in locating sound sources as in submarine detection.

Prior to this invention compensators were operated directly by rotatable members. Consequently the longitudinal movement of the transmitting path was not converted to a circular motion, and the bearing angle indicated was a trigonometric function of the true angle. Therefore a sine scale had to be used and there was likely to be considerable inaccuracy in the readings at both ends of the scale due to the small movement which represented 1°.

The object of this invention is the provision of a mechanism for converting the reciprocating movement, by which the transmitting paths of a compensator are adjusted, into a circular motion so that the true angle for a 360° movement may be measured and indicated either on a circular scale or by a rotative means such as a beam of light, and means for correlating the arc of movement of the transmitting paths and the arc of movement of the indicating scale. A device for adjusting the zero point of the scale to coincide with the middle position of the transmitting path is also provided.

The invention will be more clearly understood by reference to the following specification and accompanying drawings in which like characters of reference indicate like parts of all figures.

Fig. 2 is a plan view of the section along line 2—2 of Fig. 1.

Fig. 3 is a perspective view of an interlocking plate and washer.

Fig. 4 is a cross section along line 4—4 of Fig. 1.

Fig. 5 shows the scale.

Fig. 6 shows the diagram of the connections of the motors and reversing switch.

Figure 1:
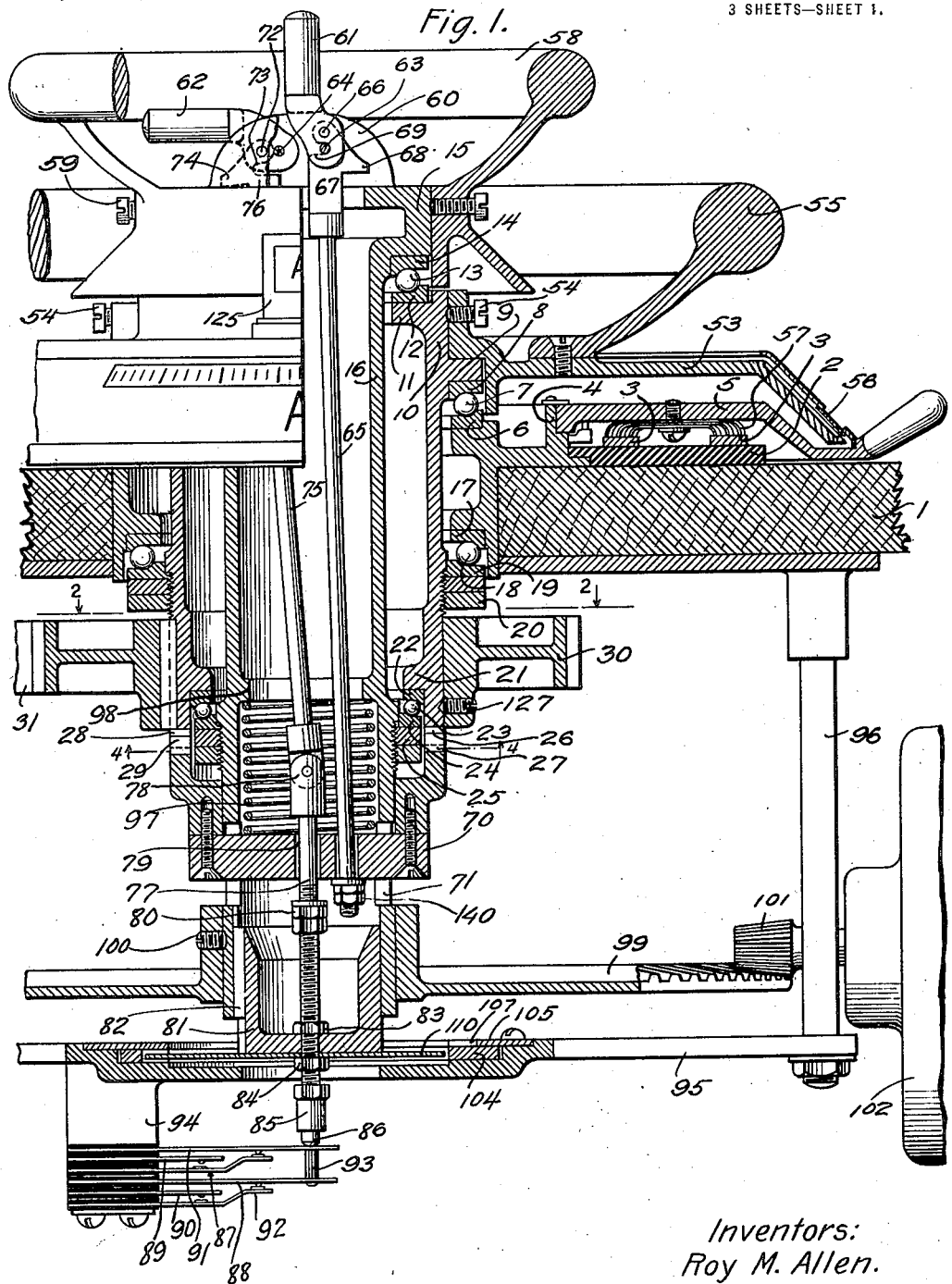
Fig. 1 is a vertical cross section.

Referring to Fig. 1, a frame 1 carries an insulation member 2 on which are mounted contact members 3 which serve in the connection of the different detectors or pairs of detectors to the transmitting paths 46 of the compensator 126. Frame 1 also supports a member 4 which carries a lower raceway (6) for ball bearings 7. A rotatable casing 5 is supported by the member 4. Carried on the balls 7 is an upper bearing member or raceway 8 which is fixed to the flange 9 of the shaft 10. Supported on the flange 11 of the shaft 10 is a lower raceway (12) for balls 13 which carry an upper bearing member 14 fixed to the flange 15 of the shaft 16. Attached to the support member 4 is a bearing member or upper raceway 17, against which the balls 18 are held by the bearing member 19 which is attached to, and supported by, member 20. Members 20 make a threaded engagement with shaft 10 thereby providing a means for regulating the pressure between the bearing members 6, 8, 17 and 19, and the ball members 7 and 18. Flange 21 of the shaft 10 has a bearing member 22 fixed thereto which forms a raceway for the members 23 which are supported by bearing 24 carried by member 25 which is engaged with a thread on the shaft 16. It is therefore seen that shafts 10 and 16 may be revolved independent of one another. The shafts may be locked together by means of teeth 26 and 28 which engage in grooves 27 and 29. The operation by which this locking is accomplished and the object will be explained in another part of the specification.

A gear 30 is mounted on the shaft 10 and rigidly attached thereto by a set screw 127. The gear wheel 30 meshes with gear wheel 31 which is rotatively mounted on a shaft 32 attached to the frame 1. A scotch yoke 33, which may be rigidly attached to gear wheel 31 is also mounted on shaft 32. The scotch yoke 33 includes a member 34 that may be adjusted to different positions by means of screw 37. Member 34 has an opening which forms a bearing for the cylindrical projection 36 of the slide member 35. Slide 35 is mounted in slideway 38 of the slideway member 39. Slideway member 39 is attached to one end of bar 40 which can be moved lengthwise on the pulleys 41 and 42. The other end of the bar 40 has an arm member 43 attached thereto which arm member has a threaded opening therein. The screw member 51, to which belt 44 is attached, engages in the threaded opening of arm member 43. Thus one end of the belt 44 is supported. The other end of the belt 44 is attached to screw member 48 which engages in a threaded opening in extension 47 of the slideway member 39. Screw member 48 is retained in any desired position by means of nuts 49 and 50. The belt 44 makes one turn around the pulley 45 and is rigidly attached to the pulley at a point 52. This pulley 45 is connected to the transmitting paths 46 of the compensator 126, and by rotating the pulley 45 the lengths of the conducting paths of the compensator may be adjusted. Pulleys 41 and 42 are supported on frame 1.

The belt 44 may be adjusted by screws 51 and 48 and locked in any desired position by nuts 49 and 50. A circular plate 53 is mounted on shaft 10 and held in the adjusted position by screws 54. The hand wheel 55, for turning the shaft 10, is carried by, and rigidly connected to the plate member 53. A double circular scale 56, graduated in degrees, is carried by the circular plate 53. The double scale 56 is covered by a rotatable casing 5 which has apertures therein for the display of the scales. Attached to the rotatable casing member 5 is a brush 57 which makes an electrical connection between any pair of contact members 3, and thus it is possible, by the rotation of casing member 5, to send out any desired number of impulses in order to connect any detector pair of a system to the transmitting paths 46 of a compensator 126 as shown in the J. B. Harlow application, Serial No. 306,405, filed June 24, 1919.

A hand-wheel 58 is attached to the shaft 16 by means of screws 59. Carried by the flange member 15 of the shaft 16 is an arc-shaped bridge 60 to which levers 61 and 62 are pivoted by pivot members 63 and 64 respectively. Levers 61 and 62 are so located that they both cannot be in a vertical position at the same time. Pivoted to lever 61 by a pin 66 is a connecting rod 65 which passes through an opening in member 70 and has nuts 140 thereon to engage the locking member 70 when the lever 61 is raised to a vertical position. A head member 67 on the connecting rod 65 has a projection 68 which engages with the upper portion of the angular flange 15 when the lever 61 is in a horizontal position. When lever 61 is in a vertical position, a groove 69 in the head member 67 engages with pivot member 63 and the pin 66 is vertically above member 63 so that lever 61 remains in its vertical position. The other end of connecting rod 65 is connected with member 70 which slides in the slideway 71 in the shaft 16. On member 70 are teeth 26 and 28 which engage with grooves 27 and 29 in the shaft 10 when the lever 61 is in a vertical position and thus shafts 10 and 16 are locked together. Pivoted to lever 62 by pivot 72 is a connecting rod 75. Attached to one end of rod 75 is a head member 76 which has a projection 74 which also engages with the angular flange 15 when the lever 62 is in its horizontal position. Groove 73 engages with pin 64 when lever 62 is in a vertical position and pivot pin 72 is vertically above pivot pin 64. Thus lever 62 will remain in a vertical position. The lower end of the connecting rod 75 is connected to a rod 77 by a knuckle joint 78. The rod 77 passes through an opening 79 in the member 70, and has its lower portion threaded. Locknuts 80 are positioned on the rod 77 so that they engage with member 70 when it is in its lower position. Slide 81 and locking plate 110 are positioned on the rod 77 by nuts 83 and 84. Slide 81 moves in guides 82 which are integral with shaft 16. A member 85, which has a tip 86 of insulation material, is screwed on to the lower end of rod 77. A spring 97 engages with the flange 98 of shaft 16 and the member 70, and forces member 70 downward and disengages shafts 10 and 16 when the levers 61 and 62 are in their horizontal positions.

A member 95, which will be more fully described in another paragraph, is suspended from frame 1 by means of bolts 96. Attached to member 95 is a member 94 which supports a number of electrical spring contact members 87 to 92 inclusive which are insulated from one another and from member 95. A spacing member 93, made of electrical insulated material, is attached to contact member 88. Spacing member 93 also engages with contact member 91 and is of sufficient length so that when contact member 91 is forced into contact with 87, contact member 88 will be moved into contact with 92. Contact members 87, 88, 91 and 92 are of the spring type.

A bevel gear 99 is mounted on shaft 16 and rigidly attached thereto by screws 100. Gear wheel 99 engages with gear wheel 101 which is directly connected to armature 112 of motor 102. Gear 99 is to gear 101 in the ratio of 20 to 1. The terminals 115 and 117 of the field windings of motor 102 are connected to contact members 92 and 87 respectively, and terminal 116 is connected to terminal 120 of the field windings of motor 111. The contact members 91 and 90 are connected to terminal 119 and 88 and 89 are connected to terminal 118 of the field windings of motor 111. Windings of armature 112 and 113 of the motors 102 and 111 are connected to a common source of alternating current 114.

Motor 111 is directly connected to a gear 121 which meshes with gear 122. Gear 121 is is to gear 122 in a ratio of the order of 1 to 20. Carried by gear 122 is an enclosed lamp 123 which emits a beam of light 124 through a slot 130 and as the gear 122 is rotated, the beam of light moves over the plotting board 129. A gear 127 which is operated by a second compensator carries an apparatus similar to that carried by gear 122 and which emits a beam of light 128.

Referring to Fig. 3, member 95 has an enlarged circular portion 109 and a large opening in its center through which rod 77 extends. In the member 109 there is a depression into which locking plate 110 may be lowered and in which a floating ring 104 is located. The projection 103 on the plate 104 fits into notch 108 of the floating ring. Angular plate 105 having notches 106 and 107 therein is fastened to member 95 and forms an angular channel therewith in which floating ring 104 may be rotated and in which plate 110 is retained and may not be removed except when projection 103 coincides with either of the notches, and when removed cannot be replaced except in the same position as that in which it was removed. A double scale 56 marked in degrees, one part of which is lettered "A" and the other "B," is carried by plate 53. The figures on the upper portion of each scale are colored green while the figures on the lower portion are colored red. Due to the fact that when the direction line becomes nearly parallel with the base line of the detectors the accuracy is decreased, and there are marked on the scale, instructions to shift to the other portion of the scale and read on certain figures, red or green. This is done in order to obtain greater accuracy in the readings. The levers 61 and 62 are colored green and red respectively so as to properly associate them with the scales correspondingly colored. Window 125 is carried by plate member 53. The casing member 5 has two apertures therein and they are lettered "A" and "B" to correspond with the scales "A" and "B." The adjustment and operation of the device is as follows.

In order to correlate the arc of movement of the transmitting paths to the arc of movement of the scale, the length of yoke 33 is adjusted by means of screw member 37. The scale 56 may be adjusted so that its zero position coincides with the center position of the means for varying the length of the transmitting paths 46 by means of screw members 51 and 48. With levers 61 and 62 in a horizontal position the shafts 10 and 16 are not connected. Brush member 57 which is carried by casing 5 contacts with two of the contact members 3 and connects a detector pair to the conducting paths 46. Contact members 91 and 88 are held in contact with members 87 and 92 by 86 so that terminals of the field windings of motor 102 are connected to corresponding terminals of the field windings of motor 111. The windings of armatures 112 and 113 are connected to a common source of alternating current. The motor 102 is directly connected to shaft 10 through the gears 99 and 101. Motor 111 is connected to the rotatable indicating mechanism which in this case is a beam of light 124 by means of gear 121. Shafts 10 and 16 are not connected together but shaft 10 is connected to the compensator 126.

Casing member 5 is rotated so as to connect through a device such as set forth in the Harlow case mentioned above, the desired detector pair to the transmitting paths 46 of compensator 126. This operation moves the apertures through which the scales are read into their proper positions for the connected detector pair. If the A section of the scale is seen through the A aperture then the hand wheel 58 is rotated until the "A" on it appears in the window 125. When the shafts 10 and 16 have the proper relative positions they may be locked together. Lever 61 which is colored green is raised to a vertical position thus raising members 70 so that the teeth 26 and 28 enter grooves 27 and 29 and lock the shafts 10 and 16 together. The lever 62 remains in a horizontal position and the member 86 engages with contact member 91 making contact between contact members 91 and 87 and members 88 and 92. This connects the field windings of the motors 102 and 111.

If a source of vibration, such as sound, is in the vicinity of the detector pair in use, it will be indicated in the binaural set. If the transmitting paths are not balanced, the hand wheel 55 is adjusted until balance is obtained. This hand wheel operates shaft 10 and therefore gear wheel 30 imparts its movement to gear wheel 31 which is of equal size. Through yoke 33 which is attached to gear wheel 31, the slide 35 is moved in its slideway 38. The slide 35 has a reciprocating movement in the slideway 38 and a circular movement with gear 31. This movement of the slide moves bar 40 lengthwise which causes the belt 44 to turn pulley 45 and thus adjust the transmitting paths of the compensator. In this way, the circular movement of the hand wheel 55 which is necessary for indicating directly the bearing angle is converted into a reciprocating movement for the adjusting of the reciprocating paths 46. The true bearing angle of the source of sound with reference to the base line of the detector pair will be indicated by the green figures appearing in the A aperture of casing member 5. It is indicated that the green figures be used by the fact that lever 61 which is in a vertical position, is green. At the same time, the bevel gear 99 is operated because it is rigidly attached to shaft 16 which is locked to shaft 10. Gear wheel 99 rotates armature 112 of motor 102 through gear 101. This shifts the lines of force to the field windings of motor 102 which are connected to the field windings of motor 111. Consequently, lines of force in the field windings of motor 111 are correspondingly shifted and armature 113 is revolved to the same relative position to its windings that armature 112 has taken. Armature 113 turns gear 121 and thus rotates the beam of light 124 which moves under the plotting board 129. This beam of light is a true direction line. When a second compensator is used to revolve a second beam of light 128 then the location of a source of sound is indicated by the point where the beams intersect. The compensator is only rotated through a maximum angle of 180° which represents the angle on one side of the base line of the detector pair, and as soon as the source of sound moves to the other side of the base line mentioned the direction of rotation of the compensator is reversed. But to provide for a 360° movement of the indicator on the plotting board 129 and to keep the true direction line, as indicated by the beam of light 124, it is necessary that the direction indicating means 124 should continue to rotate in the same direction or opposite to that of the compensator. To accomplish this, the lever 61 is thrown into a horizontal position and the wheel 58 adjusted until projection 103 of the locking plate 110 coincides with either notch 106 or 107 depending on conditions. Lever 62 is then raised moving the locking plate 87 from the channel in which it was located. This removal is performed at the left end of scale. Thus the member 70 is again raised locking the shafts 10 and 16 together. The raising of lever 62 into a vertical position raised member 86 which allowed members 88 and 91 to move upwards and make contact with members 90 and 89 and then break contact with 92 and 87 respectively. This reverses the stator of motor 111 which rotates the beam of light 124 and consequently reverses the direction of rotation of the beam, relative to the compensator. When the locking plate 110 was being adjusted to get projection 103 to coincide with either the notches 106 or 107, a floating ring 104 was rotated in the channel until notch 108 coincided with either the notches 106 or 107. If the locking plate 110 was removed from the channel with projection 103 at 106, its return with 103 at 107 is prevented by the ring 104 so that locking plate 110 must be rotated until projection 103 coincides with notches 106 and 108, then it may be returned. Therefore, before the stator of motor 111 can be changed to correspond with that of motor 102 as under normal conditions, the various parts of the apparatus must be returned to the relative positions which they had at the time of reversing the stator of motor 111.

What is claimed is:

1. In a device for indicating the direction of a source of sound a binaural compensator comprising variable transmitting paths a rotatable adjusting member and rotatable means operated by said rotatable member to indicate the true direction line.

2. In a device for measuring and indicating bearing angles, a binaural compensator comprising variable transmitting paths, a rotatable adjusting means, and means for converting the circular motion of said rotatable adjusting means to a reciprocating motion and conveying said reciprocating motion to said transmitting paths.

3. In a device for measuring and indicating bearing angles, a binaural compensator comprising variable transmitting paths, a rotatable adjusting member, a scale carried by said rotatable member to indicate the true bearing angle, a rotatable means operated by said rotatable member to indicate the direction line.

4. In a device for measuring and indicating bearing angles, a binaural compensator comprising variable transmitting paths, a rotatable member, connecting links for converting the circular motion of said rotatable member to a reciprocating motion and conveying it to the said transmitting paths.

5. In a device for measuring and indicating bearing angles, a binaural compensator comprising variable transmitting paths, a rotatable member, means for converting the circular motion of said rotatable member to a reciprocating motion, and means for conveying said reciprocating motion to said transmitting paths.

6. In a device for measuring and indicating bearing angles, a binaural compensator comprising variable transmitting paths, a rotatable member, means for converting the circular motion of said rotatable member to a reciprocating motion, means for conveying said reciprocating motion to said transmitting paths and means for indicating the bearing angle carried by said rotatable member.

7. In a device for measuring and indicating bearing angles, a binaural compensator comprising variable transmitting paths, a rotatable member, means for converting the circular motion of said rotatable member to a reciprocating motion, means for conveying said reciprocating motion to said transmitting paths, means for indicating the bearing angle carried by said rotatable member and means for indicating the direction line operated by said rotatable member.

8. In a device for measuring and indicating bearing angles, a binaural compensator comprising variable transmitting paths, a rotatable member, a scotch yoke and slideway operated by said rotatable member for converting the circular motion of the same to a reciprocating motion, a bar and belt attached to said slideway for conveying said reciprocating motion to said transmitting paths to vary the length of the same.

9. In a device for measuring and indicating bearing angles, a binaural compensator comprising variable transmitting paths, a rotatable member, a scotch yoke and slideway operated by said rotatable member for converting the circular motion of the same to a reciprocating motion, a bar and belt attached to said slideway for conveying said reciprocating motion to the transmitting paths to vary the length of the same, a scale carried by said rotative member to indicate the bearing angle.

10. In a device for measuring and indicating bearing angles, a binaural compensator comprising variable transmitting paths, a rotatable member, a scotch yoke and slideway operated by said rotatable member for converting the circular motion of the same to a reciprocating motion, a bar and belt attached to said slideway for conveying said reciprocating motion to the transmitting paths to vary the length of the same, a scale carried by said rotatable member to indicate the bearing angle, and revolvable means for indicating the direction operated by said rotatable member.

11. In a device for measuring and indicating bearing angles, a binaural compensator comprising variable transmitting paths, a rotatable member, connecting links for converting the circular motion of said rotatable member to a reciprocating motion and conveying the same to the said transmitting paths, a scale carried by said rotatable member to indicate the bearing angle, a pair of synchronous motors operated by said rotatable member, a rotary direction indicating means operated by said synchronous motors.

12. In a device for measuring and indicating bearing angles, a binaural compensator comprising variable transmitting paths, a rotatable member, connecting links for converting the circular motion of said rotatable member to a reciprocating motion and conveying the same to the said transmitting paths, a scale carried by said rotatable member to indicate the bearing angle, a pair of synchronous motors operated by said rotatable member, a rotary direction indicating means operated by said synchronous motors, a reversing switch carried by said rotatable member to reverse the stator of one of the motors in order to reverse the direction of rotation of said direction indicating means relative to that of said rotatable member.

13. In a device for measuring and indicating bearing angles, a binaural compensator comprising variable transmitting paths, a rotatable member, means for converting the circular motion of said rotatable member to a reciprocating motion and means for conveying the same to said transmitting paths, a scale carried by said rotatable member, and means for correlating the arcs of movement of said scale and said transmitting paths.

14. In a device for measuring and indicating bearing angles, a binaural compensator comprising variable transmitting paths, a rotatable member, means for converting the circular motion of said rotatable member to a reciprocating motion and means for conveying the same to said transmitting paths, a scale carried by said rotatable member, means for correlating the arcs of movement of said scale and said transmitting paths, and means for equalizing the length of said transmitting paths when said scale is at its zero position.

15. In a device for measuring and indicating bearing angles, a binaural compensator comprising variable transmitting paths, a rotatable member, means for converting the circular motion of said rotative member to a reciprocating motion and means for conveying the same to said transmitting paths, a scale carried by said rotatable member and, an adjusting screw to correlate the arcs of movement of said scale and said transmitting paths.

16. In a device for measuring and indicating bearing angles, a binaural compensator comprising variable transmitting paths, a rotatable member, means for converting the circular motion of said rotatable member to a reciprocating motion and means for conveying the same to said transmitting paths, a scale carried by said rotatable member, an adjusting screw to correlate the arcs of movement of said scale and said transmitting paths, and a plurality of screws to equalize the length of said transmitting paths when said scale is at its zero position.

17. In a device for measuring and indicating bearing angles including detectors, transmission lines and a binaural compensator comprising variable transmitting paths, means carried by said compensator to connect any predetermined pair of said detectors to said transmitting paths, a rotatable member carried by said compensator, means for converting the circular motion of said rotatable member to a reciprocating motion and conveying the same to said transmitting paths to vary the length of the same.

18. A device for measuring and indicating bearing angles comprising detectors, transmission lines and a binaural compensator including variable transmitting paths, contacts and a movable brush carried by said compensator to connect any predetermined pair of said detectors to said transmitting paths, a rotatable member carried by said compensator, connecting links to convert the circular motion of said rotatable member to a reciprocating motion and to convey said reciprocating motion to said transmitting paths to vary the same.

19. In a device for measuring and indicating bearing angles, a binaural compensator comprising variable transmitting paths, a rotatable member, connecting links comprising a gear wheel operated by said rotatable member, a second gear having a yoke attached thereto operated by said first gear, a pivoted slide mounted on said yoke, a slideway in which said slide operates, a bar and belt attached to said slideway and operated thereby, a pulley by which said transmitting paths may be varied operated by said belt, and a scale for indicating the bearing angle carried by said rotatable member.

20. In a device for measuring and indicating bearing angles comprising detectors, transmission lines and a binaural compensator including variable transmitting paths, means carried by said compensator to connect any predetermined pair of said detectors to said transmitting paths, a rotatable member carried by said compensator, connecting links for converting the circular motion of said rotatable member to a reciprocating motion and to convey said reciprocating motion to said transmitting paths to vary the same, a scale for indicating the bearing angle carried by said rotatable member and an adjusting screw for correlating the arcs of movement of said scale and said transmitting paths, a plurality of screws whereby said transmitting paths may be equalized when said scale is in its zero position, a pair of synchronous motors operated by said rotatable member, a rotary direction indicating means operated by said motors, and a reversing switch carried by said compensator to reverse the stator of one of said motors so as to reverse the direction of rotation of said direction indicating means relative to the direction of rotation of said rotatable member.

21. In a device for indicating the direction of a source of sound a binaural compensator comprising variable transmitting paths adjusted by a reciprocating motion, means for converting the said reciprocating motion to a circular motion to indicate the bearing angle on a circular scale.

22. In a device for locating a source of sound comprising detectors, transmission lines, and a plurality of compensators comprising variable transmitting paths, a plurality of rotatable adjusting members, a plurality of direction indicating means operated by said rotatable adjusting members, and means for ascertaining where the direction lines as indicated by the said direction indicating means intersect.

23. In an arrangement for measuring and indicating bearing angles, means for directly measuring the trigonometric function of an angle, and means for translating said measurement into a direct indication of the angle.

In witness whereof, we hereunto subscribe our names this 4th day of January, A. D. 1921.

ROY M. ALLEN.
PAUL NEILL.